(12) United States Patent
Casteel et al.

(10) Patent No.: US 6,411,147 B1
(45) Date of Patent: Jun. 25, 2002

(54) SYSTEM AND METHOD FOR GROUPED GATING CONTROL LOGIC

(75) Inventors: Jordan Brantley Casteel, Roanoke; Todd David Greenleaf, Salem, both of VA (US)

(73) Assignee: General Electric Company, Schenectady ( * ) Notice: Subject to any disclaimer, the term of this patent is extended or adjusted under 35 U.S.C. 154(b) by 0 days.

(21) Appl. No.: 09/685,560

(22) Filed: Oct. 11, 2000

(51) Int. Cl.[7] ................................................ H03K 3/12
(52) U.S. Cl. ....................................... 327/199; 327/225
(58) Field of Search ................................. 327/199, 225; 326/87; 345/472.1

(56) References Cited

U.S. PATENT DOCUMENTS

| | | | | | |
|---|---|---|---|---|---|
| 4,476,464 A | * | 10/1984 | Hobbs | ...................... | 345/472.1 |
| 4,812,678 A | * | 3/1989 | Abe | ........................... | 327/199 |
| 5,461,649 A | * | 10/1995 | Bailey et al. | .................. | 327/28 |
| 5,729,158 A | * | 3/1998 | Rajavan et al. | ................ | 326/87 |
| 6,084,434 A | * | 7/2000 | Keeth | ........................... | 326/87 |
| 6,097,219 A | * | 8/2000 | Urata et al. | .................... | 326/87 |

\* cited by examiner

Primary Examiner—Terry D. Cunningham
Assistant Examiner—Linh Nguyen
(74) Attorney, Agent, or Firm—Karl Vick, Esq.; Kevin T. Duncan, Esq.; Hunton & Williams

(57) ABSTRACT

Grouped gating control logic allows for one or more inputs in a group to be active at any given time. Once an input signal in a group is active, all other pulse trains received in the same group can be locked out. Thus, by using a finite state machine to control gate pulses, the noise margin of the gating unit can be regulated and an extra level of protection is available should one of the input gating signals be defective.

14 Claims, 6 Drawing Sheets

SYSTEM AND METHOD FOR GROUPED GATING CONTROL LOGIC

BACKGROUND OF THE INVENTION

This invention relates to control logic. In particular, this invention relates to gated grouping of control logic.

The extensive algorithm development in the control electronics field has been applied in the past to provide lockouts and other devices that help prevent improper gating. In particular, in the field of power electronics, the algorithmic approach has been used to prevent improper gating of silicon controlled rectifiers in a power converter. Furthermore, high noise immunity signal transmission techniques, including differential electrical interfaces, optical couplers, and fiber optic interfaces, have also been employed. Furthermore, analog filters have been used on the gate pulse amplifier portion of a power converter system to reduce noise.

BRIEF SUMMARY OF THE INVENTION

However, large amounts of digital logic are generally avoided due to the high power levels associated with the gate pulse amplifier cards. Furthermore, often the signals applied to the gate pulse amplifier cards are gating enables instead of gating pulse trains. With this approach, logic is required on the gate pulse amplifier card to produce pulse trains during the period the enable signal is active. This approach reduces the bandwidth and wave shape requirements with the transmission media, but can introduce gating skew in multiple converter environments. Additionally, if the gating input signal fails in the "on" state, mis-gating of the converter and excessive power consumption in the gate pulse amplifier card can occur.

The systems and methods of this invention group gating control logic. This grouped gating control logic can be applied to power converter systems. However, it should be appreciated that the group gating control logic systems and methods of this invention can be applied to any control system. For example, a system which control multiple mutually exclusive outputs such as mechanical relays or, for example, lights could use the methods and systems of this invention.

In particular, logic is added in a gate pulse control system. The gate pulse control system filters noise glitches from incoming pulse trains and provides minimum on and off times for the outgoing pulses. Furthermore, through the use of a gating state machine, the timing and filtering of the gate pulse control system can be modified based on the particular application environment.

These and other features of the invention are described in or apparent from the following Detailed Description of the Preferred Embodiments.

BRIEF DESCRIPTION OF THE DRAWINGS

The preferred embodiments of the invention will be described in detail, with reference to the following Figures, wherein.

DETAILED DESCRIPTION OF THE INVENTION

Grouped gating control logic allows for one or more inputs in a group to be active at any given time. Once an input signal in a group is active, all other pulse trains received in the same group can be locked out. Thus, the noise margin of the gating unit can be regulated, and an extra level of protection is available should one of the input gating signals be defective.

Figure 1:
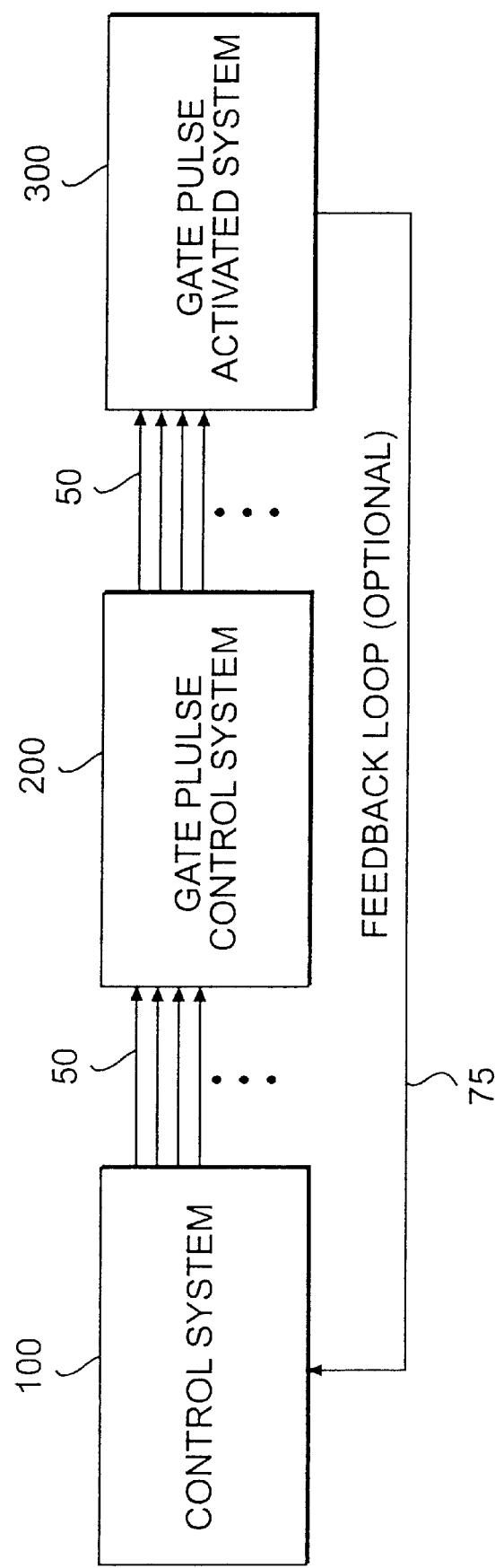
FIG. 1 is a functional blocked diagram illustrating a first embodiment of the grouped gating control logic system according to this invention.

FIG. 1 illustrates an exemplary embodiment of the grouped gating control logic system. In particular, the group gating control logic system comprises a control system 100, a gate pulse control system 200, a gate pulse activated system 300, and an optional feedback loop 75, all interconnected by links 50.

The links 50 can be any wired or wireless link or any other known or later developed element(s) that are capable of supplying electronic data to and from the connected elements. Furthermore, the links 50 can be any one of, or a combination of, a direct connection, a distributed network, such as an intranet, a local area network, a metropolitan area network, a wide area network, a satellite communication network, an infrared communication network, the Internet, a fiber optic or fiber optic hybrid network, or the like.

The control system 100 can be any control system that generates or forwards logic level gate pulse information. In particular, the control system 100 can be a software driven system, a hardware driven system, or dedicated logic level gate pulse generation device. In general, any device capable of generating and/or forwarding logic level gate pulse control signals will work equally well with the systems and methods of this invention.

The control system 100 forwards one or more control signals, via one or more of the links 50, to the gate pulse control system 200. The gate pulse control system 200, by analyzing the grouped set of control signal inputs from the control system 100, provides gate pulse output control signals, via link 50, to the gate pulse activated system 300. The gate pulse control system 200, thus manages the plurality of input control signals from the control system 100 before distribution to the gate pulse activated system 300.

The optional feedback loop 75 can be used to supply feedback information from the gate pulse activated system 300 to the control system 100 as is well known in the art. For example, in a power converter system, feedback information might include converter output voltage and/or current, power switching device conduction status and/or any other information that can be used for control and diagnostics of a system.

Figure 2:
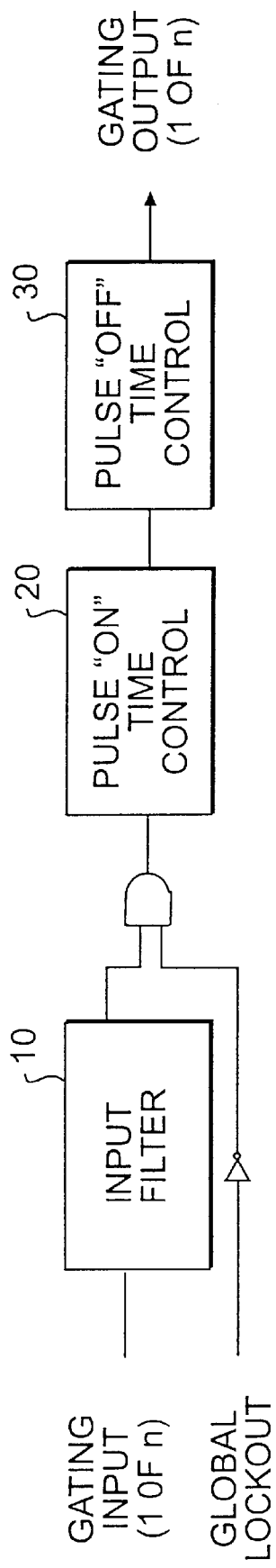
FIG. 2 is a functional blocked diagram illustrating a single gating logic control circuit according to this invention.

FIG. 2 illustrates an exemplary embodiment of a single input gating logic control circuit. In particular, this system includes an input system 10, a pulse "on" time control 20, and a pulse "off" time control 30.

A gating input is received by the input filter 10. The gating input signal is then managed by the pulse "on" time control 20, and the pulse "off" time control 30 before being output as a gating output. For a multi-input system, a duplicate of the system illustrated in FIG. 2 would be required for each gating input independently of other gating inputs that may be required for the general system. Thus, each gating input is conditioned, amplified, and output to its respective device without interaction with other gating circuits. However, by applying digital logic independently to each gating channel as illustrated in FIG. 2, separate logic for each gating input is required.

Figure 3:
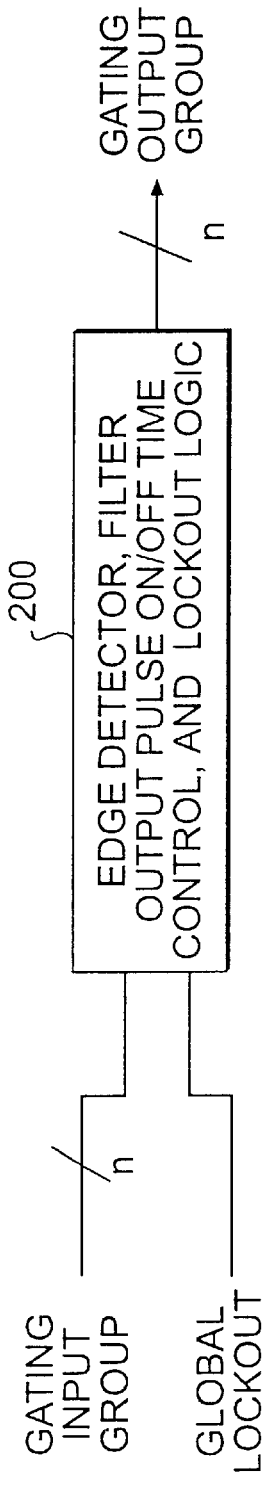
FIG. 3 is a simplified block diagram of the grouped gating control logic system illustrated in FIG. 1 according to this invention.

FIG. 3 is a simplified functional block diagram of the grouped gating control logic in accordance with a first embodiment of this invention. In particular, a plurality of gating inputs are received by the gate pulse control system 200. These gating inputs can then be effected and managed by, for example, an edge detector, a filter, an output pulse on/off time control, lockout logic circuitry, other waveshaping and signal control functions, or the like. Since the plurality of the gating inputs are all controlled and managed by the single gate pulse control system 200, the amount of logic required is reduced.

Figure 4:
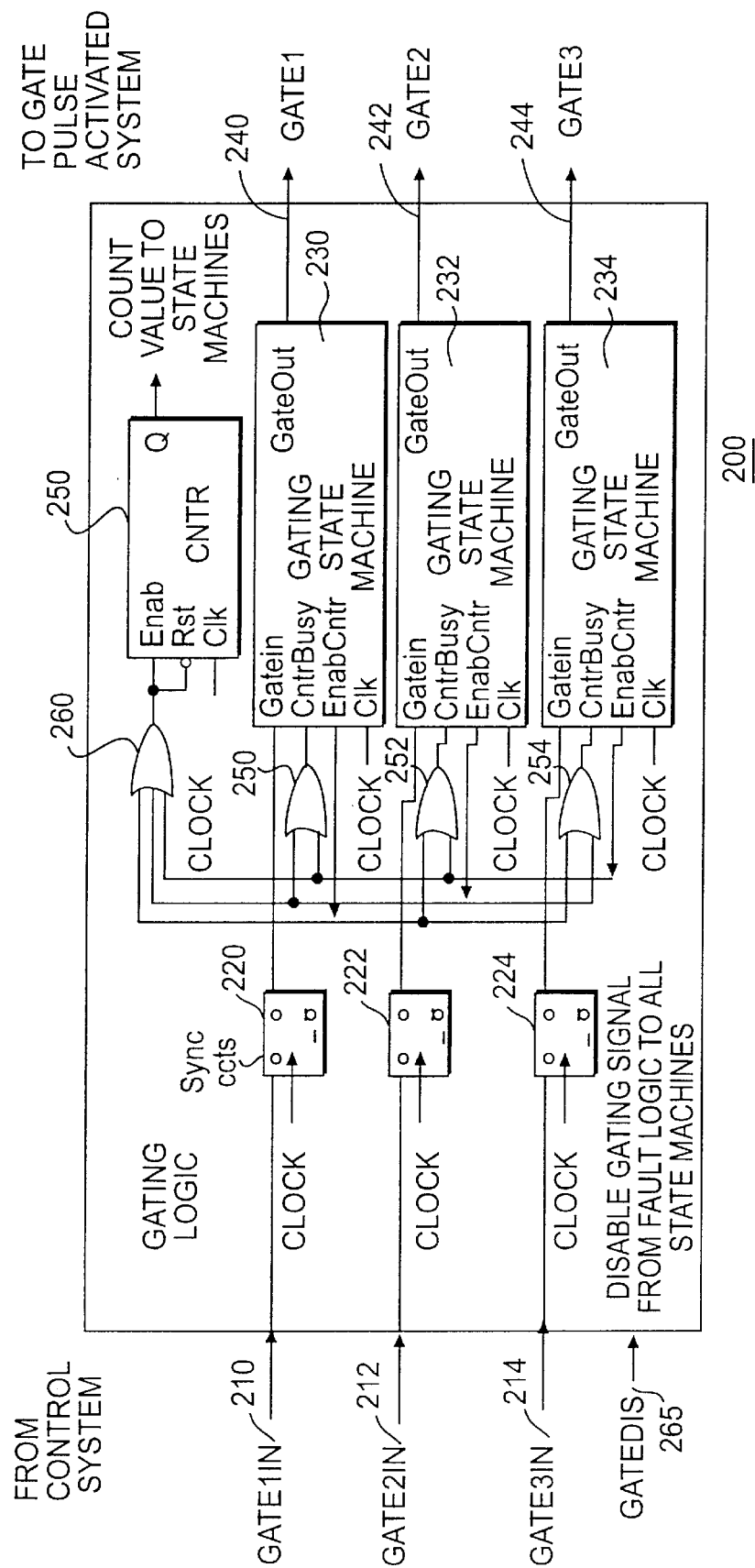
FIG. 4 is a functional block diagram illustrating the gate pulse control system of FIG. 1 in greater detail according to this invention.

FIG. 4 illustrates an exemplary embodiment of the gate pulse control system 200. In particular, the gate pulse control system 200 comprises a plurality of control signal inputs 210–214, a plurality of synchronize circuits 220–224, a plurality of OR circuits 250–254, a plurality of gating state machines 230–234, a plurality of gate pulse outputs 240–244, an OR gate 260, a counter 250, and a gate disable input 265.

It is to be appreciated that while the gate pulse control system 200 illustrated in FIG. 4 has three inputs and three outputs, the number of inputs and outputs can be varied based on the particular operating environment in which the gate pulse control system is implemented. For ease of illustration, a set of three inputs and outputs, and corresponding gating state machine circuitry, is illustrated in FIG. 4. Thus, the logic for each control signal in/out section would need to be duplicated for each additional control signal input.

A master clock (not shown) controls the clocking throughout the gate pulse control system 200. Thus, each gating input 210–214 is synchronized to the clock via the synchronization circuit 220–224, such as a flip-flop, respectively. This synchronization allows all downstream logic devices to receive the same value from the gating input even if the input transitions near the system clock edge. After synchronization, each of the control signal inputs is forwarded to its respective gating state machine 230–234. These gating state machines 230–234 control the gate pulse outputs. The three illustrated gating state machines 230–234 communicate with counter 250. The counter 250 performs the timing functions necessary for accomplishing rising and falling edge input filters and timing for output on and off time signal widths.

The gate disable input 265, is used to disable gating signals received from one or more fault logic devices. For example, the disabled gating signal can come from a temperature control circuit, fault-type logic remote sensors, global lockouts, maintenance interlocks, power supply monitors, or the like.

Figure 5:
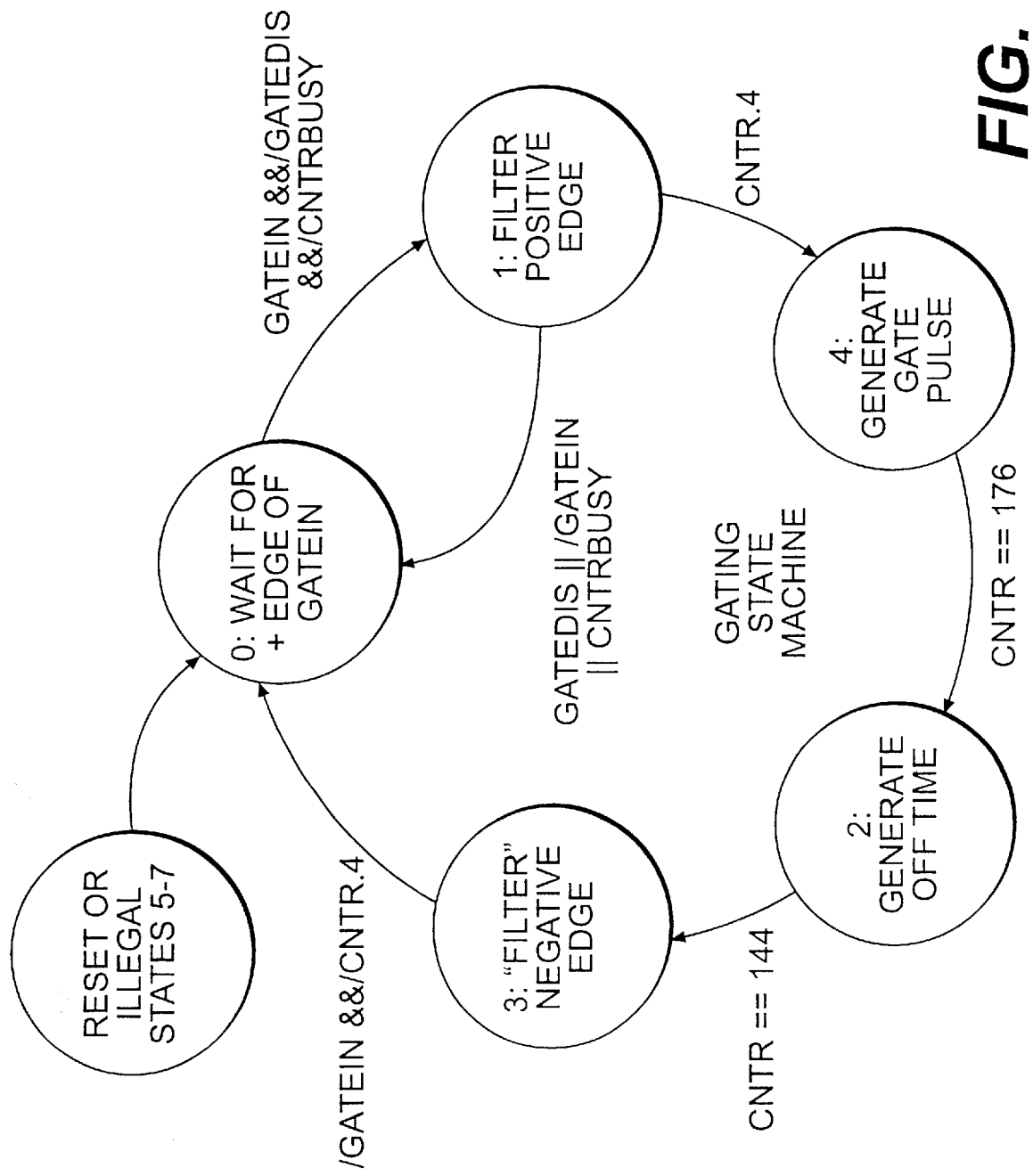
FIG. 5 illustrates an exemplary state machine logic chart according to the first embodiment of this invention according to this invention.

FIG. 5 illustrates the operation of the gate pulse control system 200. In particular, the state machine represents the operation of the gating state machines 230–234 in FIG. 4. Thus, in this exemplary embodiment, with three control signal inputs and three gate pulse outputs, each gating state machine 230–234 requires only three bytes. The eight possible states of the state machine are numbered 0–7, using normal binary coding of the bytes, and the states 5–7 are unused. Thus, in FIG. 5, the five valid states of the state machines and the logic conditions necessary for a transition to occur from one state to another are illustrated.

In operation, the state machine will be in state 0. When the gating input of the gating state machine goes high, the state machine will transition to state 1 unless the global gating signal disable is set or one of the other state machines in the gating group is already using the counter. The counter 250 is enabled when any of the state machines is not in state 0, i.e., state greater than 0. As soon as the state machines leaves state 0, the state machine enables the counter and locks out the other state machines in the group from using the counter or exiting from their 0 state.

State 1 provides the gating input filter. The state machine normally remains in state 1 until the counter counts to a predetermined time. However, if the gating input is a glitch, or if the global gating disable becomes active during this state, the state machine resets to state 0 and begins again. Additionally, if another gating input causes its respective state machine to transition to state 1 at exactly the same time, both state machines will see their counter busy inputs go "true." This causes both of the state machines to return to state 0. Thus, the combination of logic illustrated in FIG. 4 insures that only one gate in a group will ultimately be gated. In the event that multiple gating inputs are received at the same time, due to, for example, a noise glitch, control error, or the like, the state machines oscillate between states 0 and 1 until only one gating input remains true.

If the state machines remains in state 1 for a predetermined time, it will then transition to state 4. FIG. 5 illustrates, for example, remaining in state 1, while the counter increments from 1 to 16. During state 4, the gating output "on" time is determined. Since states 5–7 are not used, state 4 is the only valid state in which bit two of the three bit state machines is used. Therefore, bit two of the state machine is used directly as the gating output, further reducing the required logic in a hardware-based implementation. Once the state machine enters state 4, it can only return to state 0 by completing the sequence through state 4, 2, and 3, as illustrated. The state machine remains in state 4 until a predetermined time lapses on the counter, from count, for example, 16 to 176, in the illustration, ensuring the required gate pulse width is met and that no sliver pulses can occur. The state machine then transitions to state 2, where the counter is monitored to insure the required predetermined "off" time is set. In FIG. 5, the 9-bit counter illustratively counts from 177 to 511, rolls over to 0, and counts to 144 to determine the "off" time. Finally, the state machine waits in state 3 to insure the gating input has returned to 0 for up to a predetermined time. At this point, the state machine returns to state 0, which in turn releases the counter resource for use by other state machines in the gating group.

Occasionally, in particular hardware embodiments, electrical noise or a power supply glitch may disturb the logic causing the state machine bits to transition to the unused states 5–7. In this event, FIG. 5 illustrates that the logic automatically recovers by transitioning back to, for example, valid state 0.

Figure 6:
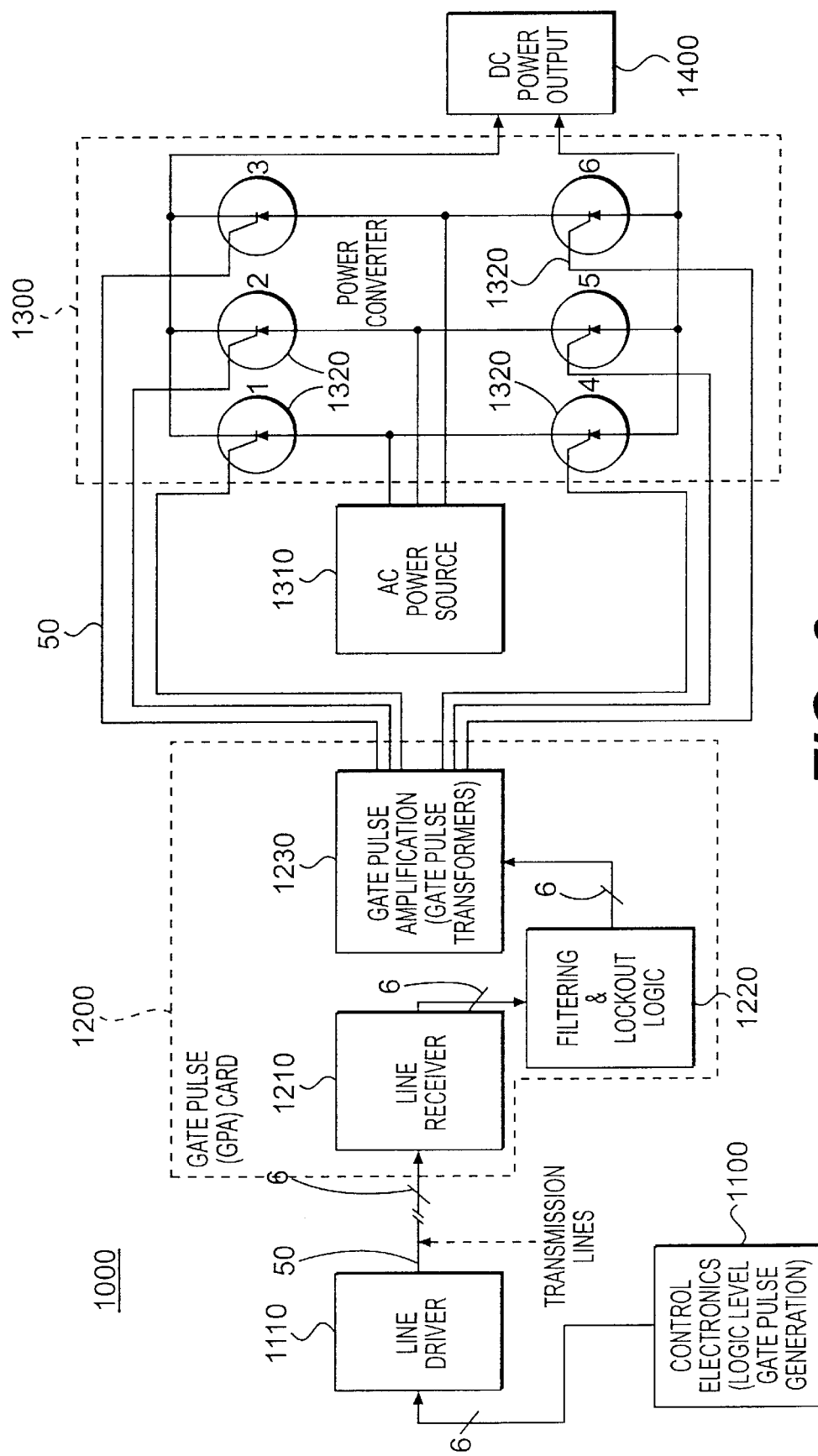
FIG. 6 is a functional block diagram illustrating a second embodiment of the grouped gating control logic according to this invention.

FIG. 6 illustrates an exemplary embodiment of a gate pulse control system adapted for use in a silicon controlled rectifier power circuit. In particular, the device comprises control electronics 1100, a gate pulse card 1200 and a power converter 1300. Additionally, the device comprises a line driver 1110, an AC power source 1310, and links 50.

The gate pulse card 1200 comprises a line receiver 1210, a filtering and lockout logic device 1220, and a gate pulse amplification device 1230. The power converter 1300 comprises a plurality of silicon-controlled rectifiers 1320.

Thus, FIG. 6 illustrates an exemplary embodiment of the typical components of a power converter system. The control electronics 1100 determine the gating patterns needed to control the power semiconductor devices in the power converter 1300. When the control electronics 1100 are not co-located with the power converter 1300, it may be necessary to add components such as the line driver 1110, the line receiver 1210, and associated links 50. The filtering and lockout logic 1220 is comparable to the gate pulse control system 200 as previously discussed. However, the gate pulse control system 1220 has been adapted for use in this particular exemplary embodiment to have six control signal inputs and six gate pulse outputs to the power converter 1300. Thus, after filtering and lockout logic is performed by the filtering and lockout circuit 1220, the control signals are forwarded to the gate pulse amplification device 1230. The signals are then amplified to the levels required to drive the power converter 1300.

For illustration purposes, the power converter 1300 is illustrated as being a three-phase AC to DC converter consisting of six silicon controlled rectifiers 1320. However, it is to be fully appreciated that one of ordinary skill in the art could adapt the basic concepts disclosed herein to cover a variety of other converter topologies besides the one shown. For the power converter system illustrated in FIG. 6, six silicon-controlled rectifiers are used. The gating input supplied to the gate pulse card 1200 is approximately 12 $\mu$s wide and the pulses are applied at a rate of approximately 22 kHz. Thus, glitches less than 1 $\mu$s wide should not produce gating outputs. To insure an adequate gating pulse without saturating the gate pulse transformers, valid gating outputs should be 10 $\mu$s wide followed by an off time of at least 30 $\mu$s. For a reliability in the event of a "stuck-on" input, once an output pulse is generated, the input must go low for at least 1 $\mu$s before the next input pulse will be accepted. To insure load sharing, skew between multiple power converters due to the gate pulse card and digital logic should be less than 100 ns.

FIGS. 4 and 6 illustrate the devices used to implement these requirements for the three upper silicon-controlled rectifier gating signals of the power converter 1300. This logic is duplicated for the three lower signals. In this exemplary embodiment, a 16 MHz clock is used. The 16 MHz clock has a period of 62.5 ns. Since all of the logic and design runs at this rate, all gate pulse cards 1200 are synchronized to within 62.5 ns, therefore meeting the 100 ns skew requirement. As previously discussed, each gating input is synchronized to the clock via the flip/flop. Thus, all downstream logic receives the same value from the gating input, even when the input transitions are near the system clock edge. Each of the three synchronized gating inputs are fed through its own gating state machine, which forms a gating output. The three state machines share a single counter, which performs all timing functions necessary for rising and falling edge input filters, and output on- and off-time signal widths. In this exemplary embodiment, a nine-byte counter is used that has 512 states. Running at 16 MHz, this gives the counter a time span of up to 32 $\mu$s, which is sufficient for all of the time delays specified.

For the six silicon-controlled rectifier power converter circuits illustrated in FIG. 6, each gating input requires one flip-flop for synchronization and three flip-flops for the state machine. Nine flip-flops are needed for each of the nine-byte counters for the two groups. Thus, in this exemplary embodiment, the entire design is implemented with 42 flip-flops and associated combinatorial logic.

Figure 7:
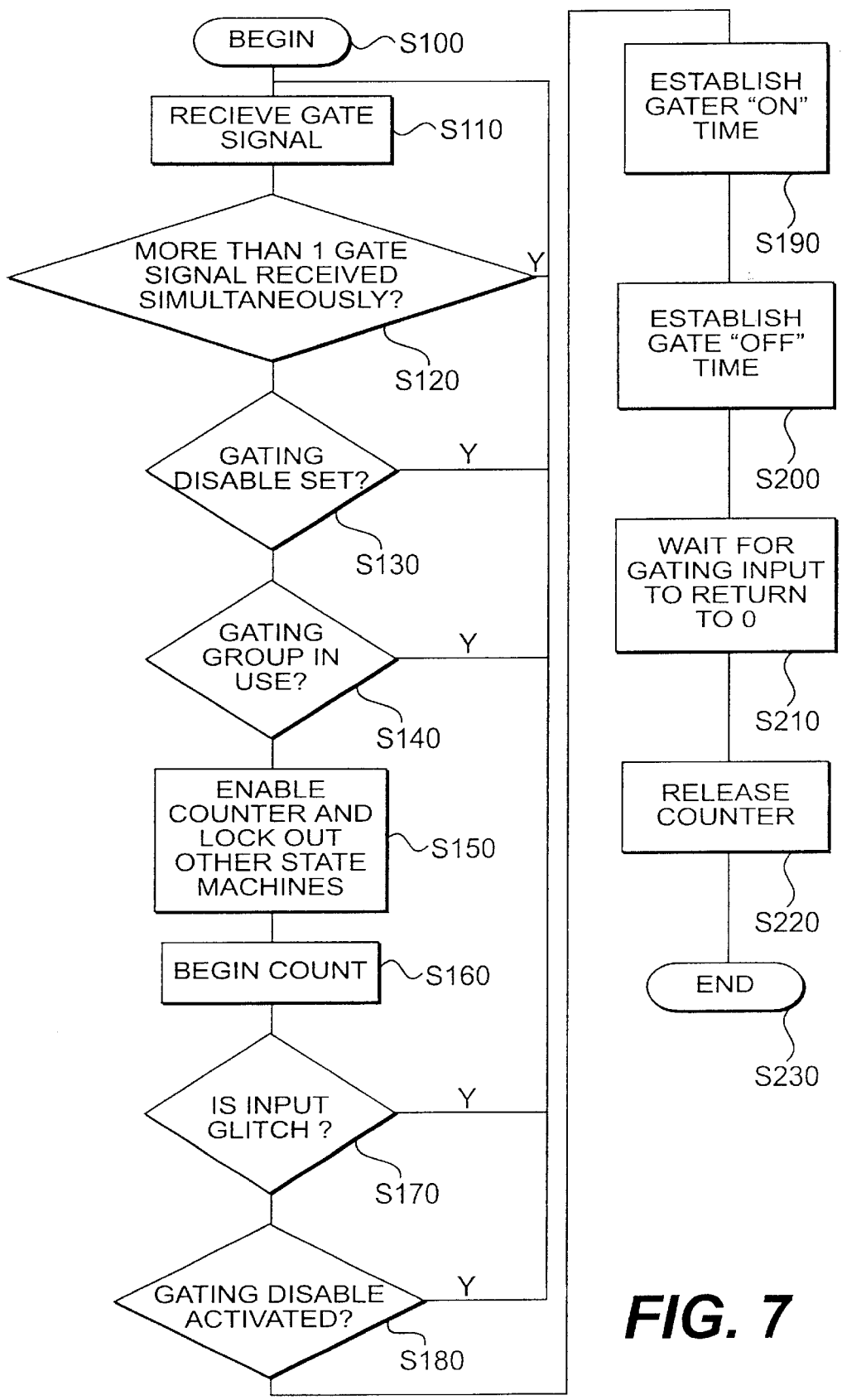
FIG. 7 is a flowchart outlining one exemplary embodiment of a method for grouping gated control logic according to this invention.

FIG. 7 illustrates the method of using grouped gating inputs according to this invention. Specifically, control begins in step S100 and continues to step S110. In step S110, a gate signal is received. Next, in step S120, a determination is made whether mare than one gate signal has been received simultaneously. If more than one gate signal has been received, control jumps back to step S110. Otherwise, control continues to step S130.

In step S130, a determination is made whether the gate disable has been set. If the gate disable has been set, control jumps back to step S110. Otherwise, control continues to step S140.

In step S140, a determination is made whether the gating group is already in use. If the gating group is already in use, control jumps back to step S110. Otherwise, control continues to step S150.

In step S150, the counter is enabled and the other state machines are locked out. Next, in step S160, a count is begun. Then, in step S170, a determination is made whether the received input is a glitch. If the received input is a glitch, control jumps back to step S110. Otherwise, control continues to step S180.

In step S180, a determination is made whether the gate disable has been activated. If the gate disable has been activated, control jumps back to step S110. Otherwise, control continues to step S190.

In step S190, the gate "on" time is established. Next, in step S200, the gate "off" time is established. Then, in step S210, the gating input returns to 0. Control then continues to step S220.

In step S220, the counter is released. Control then continues to step S230 where the control sequence ends.

As illustrated in FIGS. 1, 3–6, the grouped gating control logic system is preferably implemented on a programmable logic device. However, the grouped gating control logic system can also be implemented on a single program general purpose computer, a separate progarm general purpose computer, a special purpose computer, a programmed microprocessor or microcontroller and peripheral integrated circuit element, an ASIC, or other integrated circuit, a digital signal processor, a hard-wired electronic or logic circuit such as a discrete element circuit, a programmable logic device such as a PLA, PLD, FPGA, PAL, or the like. In general, any device capable of implementing a finite state machine that is in turn capable of implementing the flowchart illustrated in FIGS. 7 and/or the state machine in FIG. 5 can be used to implement the grouped gating control logic system.

Furthermore, the disclosed method may be readily implemented in software using object or object-oriented software development techniques in environments that provide portable source code that can be used in a variety of computer or workstation hardware platforms. Alternatively, the disclosed grouped gating control logic system may be implemented partially or fully in hardware using standard logic circuits or a VLSI design. Whether software or hardware is used to implement the systems and methods in accordance with this invention is dependent on the speed and/or efficiency requirements of the system, the particular function, and particular hardware or software systems or microprocessor or microcomputer system being utilized. The grouped gating control logic systems and methods described above, however, can be readily implemented in hardware or software, using any known or later-developed systems or structures, devices, and/or software by those skilled in the applicable art without undue experimentation from the functional description provided herein, together with a general knowledge of the computer arts. Moreover, the disclosed EQO methods may be readily implemented as software executed on a programmed general purpose computer, a special purpose computer, a microprocessor, a server or the like. In this case, the methods and systems of this invention can be implemented as a routine embedded on a personal computer or server, such as a JAVA® or CGI script as a resource residing on a server or graphics workstation as a routine embedded in a dedicated grouped gating control logic system, a distributed network based control system, a PDA interface, or the like. The grouped gating control logic system can also be implemented by physically incorporating the systems and methods into a software and/or hardware system, such as the hardware and software systems of a graphics workstation or dedicated grouped gating control logic system.

It is, therefore, apparent that there has been provided, in accordance with the present invention, systems and methods for grouped gating control logic. While this invention has been described in conjunction with the preferred embodiments thereof, it is evident that many alternatives, modifications and variations be apparent to those skilled in the applicable art. Accordingly, applicants intend to embrace all such alternatives, modifications, and variations that follow within the spirit and scope of this invention.

What is claimed is:

1. A grouped gating control logic system comprising:

a plurality of input control signals;

a gate pulse control system; and a plurality of gate pulse output signals, wherein a gate pulse control system further including a plurality of gating machines that controls a timing of the plurality of gate pulse output signals, each gating state machine corresponding to a particular input control signal and gate pulse output signal such that each gating state machine does not interact with other gating state machines and wherein the gate pulse control system analyzes a grouped set of input control signals to determine the plurality of gate pulse output signals.

2. The system of claim 1, wherein the operation of each of the plurality of gating state machines is based on at least one finite state machine.

3. The system of claim 1, further comprising at least one of an edge detector, a filter, an output pulse on/off time control circuit, a lockout logic circuit, a waveshaping device and a signal control device.

4. The system of claim 1, wherein if one input control signal in the grouped set of input control signals is active, a remainder of the input control signals are disregarded.

5. The system of claim 1, further comprising a counter that is capable of at least one of filtering a rising or a falling edge of the at least one input control signal and determining an output on/off time for the at least one gate pulse output signal.

6. The system of claim 1, further comprising a feedback loop that supplies information from a gate pulse activated system to the gate pulse control system.

7. A method of grouping gating control logic comprising:

receiving a plurality of input control signals;

determining a timing of the plurality of gate pulse output signals based upon a plurality of gating state machines, each gating state machine corresponding to a particular input control signal; and determining a plurality of gate pulse output signals based on an analysis of a grouped set of input control signals.

8. The method of claim 7, wherein the timing of each of the plurality of gate pulse output signals is based on at least one finite state machine.

9. The method of claim 7, further comprising at least one of detecting an edge, filtering, determining output pulse on/off time, determining logic lockout, performing waveshaping and determining signal control.

10. The method of claim 7, wherein if one input control signal in the grouped set of input control signals is active, a remainder of the input control signals are disregarded.

11. The method of claim 7, further comprising at least one of filtering a rising or a falling edge of the plurality of input control signals and determining an output on/off time for the plurality of gate pulse output signal.

12. The method of claim 7, herein the method is used in a power supply devices.

13. The method of claim 7, wherein the method is used in a silicon controller rectifier power device.

14. The method of claim 7, further comprising receiving information from a gate pulse activated system, and determining the at least one gate pulse output signal based on an analysis of the grouped set of input control signals and the information.

* * * * *